United States Patent
Maruyama et al.

(10) Patent No.: US 7,446,729 B2
(45) Date of Patent: Nov. 4, 2008

(54) LOOP ANTENNA UNIT AND RADIO COMMUNICATION MEDIUM PROCESSOR

(75) Inventors: Keisuke Maruyama, Miyazaki (JP); Futoshi Deguchi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 31 days.

(21) Appl. No.: 10/590,964

(22) PCT Filed: Sep. 22, 2005

(86) PCT No.: PCT/JP2005/017516
§ 371 (c)(1),
(2), (4) Date: Aug. 29, 2006

(87) PCT Pub. No.: WO2006/033408
PCT Pub. Date: Mar. 30, 2006

(65) Prior Publication Data
US 2007/0139285 A1    Jun. 21, 2007

(30) Foreign Application Priority Data

| Sep. 22, 2004 | (JP) | ............................... 2004-275318 |
| Sep. 30, 2004 | (JP) | ............................... 2004-287051 |
| May 12, 2005 | (JP) | ............................... 2005-139545 |

(51) Int. Cl.
*H01Q 21/00* (2006.01)
*H01Q 11/12* (2006.01)

(52) U.S. Cl. ...................................... 343/867; 343/742

(58) Field of Classification Search .......... 343/700 MS, 343/742, 867, 846, 787, 788, 860
See application file for complete search history.

(56) References Cited

U.S. PATENT DOCUMENTS 5,198,826 A    3/1993    Ito (Continued)

FOREIGN PATENT DOCUMENTS

EP    1484816    12/2004

(Continued)

OTHER PUBLICATIONS

PCT International Search Report dated Jan. 10, 2006.

(Continued)

*Primary Examiner*—Hoang V Nguyen
(74) *Attorney, Agent, or Firm*—Dickinson Wright, PLLC

(57) ABSTRACT

It is an object of the present invention to provide a radio communication medium processor having a stable performance that does not receive a limitation for an installed place, especially, the influence of a metallic structure, does not need to adjust the resonance frequency of an antenna or an impedance, is excellent in its convenience and extensibility upon installation and strong for unnecessary noise from a periphery.

In electric current fed loop antenna units, non-electric current fed loop antenna are arranged in doughnut shapes outside the substantially same planes of electric current fed loop antennas so as to surround the electric current fed loop antennas. Thus, when non-electric current fed loop antenna units are installed linearly, in radial directions and in arrays adjacently to electric current fed loop antenna units, the influence of the non-electric current fed loop antenna units to the antenna characteristics of the electric current fed loop antenna units can be suppressed. When the non-electric current fed loop antenna units are extended and increased, the antennas of the electric current fed loop antenna units do not need to be adjusted.

20 Claims, 17 Drawing Sheets

U.S. PATENT DOCUMENTS

| | | | |
|---|---|---|---|
| 5,602,556 | A | 2/1997 | Bowers |
| 7,154,449 | B2 * | 12/2006 | Liu et al. .................... 343/867 |
| 2003/0139163 | A1 | 7/2003 | Noda et al. |
| 2004/0100413 | A1 | 5/2004 | Waldner |
| 2005/0162331 | A1 * | 7/2005 | Endo et al. ................. 343/788 |

FOREIGN PATENT DOCUMENTS

| | | |
|---|---|---|
| EP | 1 837 951 | 9/2007 |
| JP | 6031290 | 9/1985 |
| JP | 2824791 | 9/1998 |
| JP | 2000269724 | 9/2000 |
| JP | 2001085927 | 3/2001 |
| JP | 2001251128 | 9/2001 |
| JP | 2002344225 | 11/2002 |
| JP | 2002353735 | 12/2002 |
| JP | 2003168914 | 6/2003 |
| JP | 3452971 | 7/2003 |
| JP | 2004166175 | 6/2004 |
| JP | 2004213582 | 7/2004 |
| JP | 2004215061 | 7/2004 |
| JP | 3586915 | 8/2004 |
| WO | 03/096478 | 11/2003 |

OTHER PUBLICATIONS

United Kingdom Office Action dated May 20, 2008.

* cited by examiner

FIG. 10 (a)

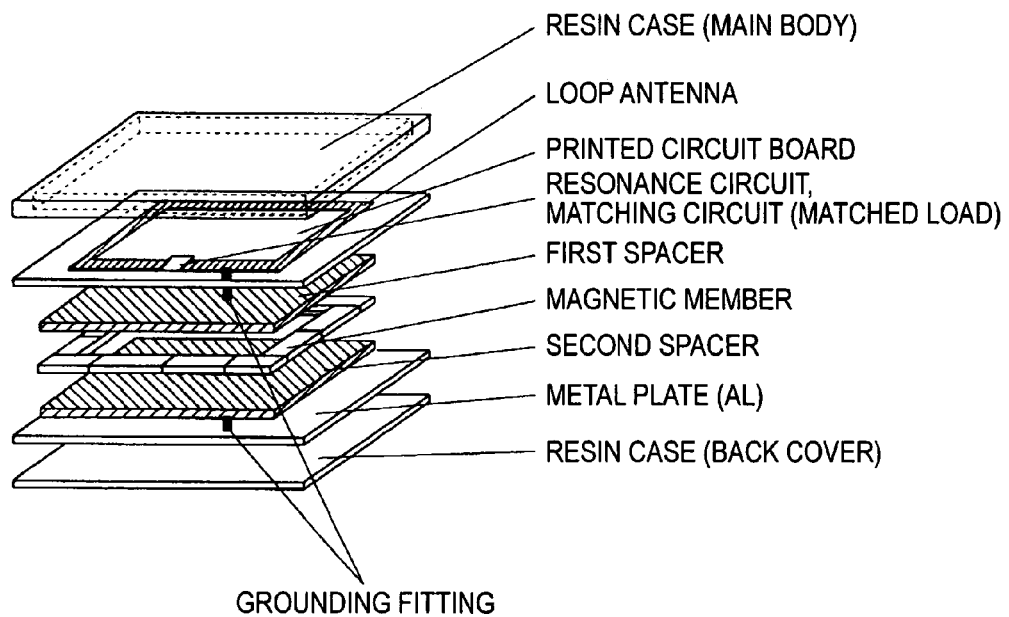

- RESIN CASE (MAIN BODY)
- LOOP ANTENNA
- PRINTED CIRCUIT BOARD
- RESONANCE CIRCUIT, MATCHING CIRCUIT (MATCHED LOAD)
- FIRST SPACER
- MAGNETIC MEMBER
- SECOND SPACER
- METAL PLATE (AL)
- RESIN CASE (BACK COVER)
- GROUNDING FITTING

FIG. 10 (b)

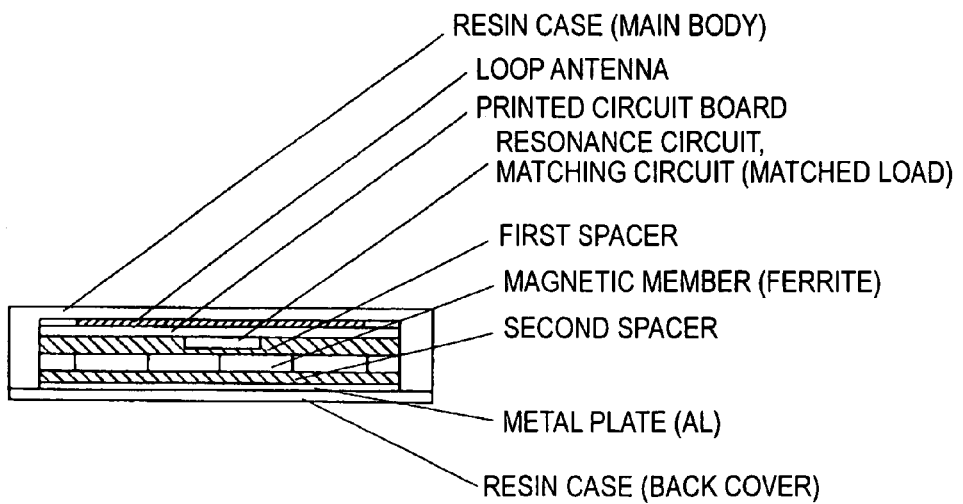

- RESIN CASE (MAIN BODY)
- LOOP ANTENNA
- PRINTED CIRCUIT BOARD
- RESONANCE CIRCUIT, MATCHING CIRCUIT (MATCHED LOAD)
- FIRST SPACER
- MAGNETIC MEMBER (FERRITE)
- SECOND SPACER
- METAL PLATE (AL)
- RESIN CASE (BACK COVER)

LOOP ANTENNA UNIT AND RADIO COMMUNICATION MEDIUM PROCESSOR

TECHNICAL FIELD

The present invention relates to a radio communication medium processor for supplying electric power and transmit data to a radio communication medium such as a non-contact IC card or an IC tag stuck to goods or books to be accommodated in a goods shelf to obtain receive data from the radio communication medium by the variation of a load. More particularly, the present invention relates to a loop antenna unit and a radio communication medium processor preferably used for an accommodating shelf or a display shelf in which the management of books and the management of goods can be automatically realized.

BACKGROUND ART

Usually, a reader writer system using the IC card is ordinarily referred to as a non-contact IC card system, and has been put to practical use in a physical distribution system, a transportation system, a goods management and book management system or the like using a frequency band of, for instance, 13.56 MHz. This system includes the IC card having an IC chip and an antenna coil on one card made of a resin and a reading and writing part for communicating with the IC card. The reading and writing part is provided with a loop antenna. The electric power and the transmit data are constantly or intermittently transmitted and the receive data is obtained from the IC card located within a range where the electric power and the transmit data can be received by this loop antenna.

As means for increasing a communication range of the usual reading and writing part, a consideration may be made that the size of one loop antenna is increased. However, when the size of the antenna is enlarged, the sensitivity of the antenna is increased. Thus, a problem arises that the influence of unnecessary noise from a peripheral part is liable to be received and the increase of the radiation of an electric field to a remote place greatly affects other electronic devices. Further, problems arise in view of an electric performance and a mechanical performance that the antenna itself is liable to be affected by structures such as neighboring metal owing to the increase of the antenna size, and the improvement of strength is required in terms of a mechanism, and as a result, a weight is increased.

Further, as another means for increasing the communication range, a contrivance is proposed that a closed loop circuit (a resonance circuit) is arranged in the vicinity of the loop antenna and electro-magnetically connected to the loop antenna so that a magnetic flux generated in the loop antenna passes the closed loop circuit (resonance circuit), and accordingly, the closed loop circuit functions like the loop antenna to widen the communication range.

As one example thereof, FIG. 19 shows a perspective view of an antenna unit in a related art described in (Patent Document 1). In FIG. 19, the antenna unit 101 has a loop antenna 111 provided on an antenna substrate 102 via a driver 107 connected to an oscillator 108 and closed loop circuits 112 and 121 arranged in the periphery thereof. The closed loop circuits 112 and 121 electro-magnetically connected to the loop antenna 111 by a magnetic flux 113 generated from the loop antenna 111 function like the loop antenna 111.

Patent Document 1: JP-A-2001-85927

DISCLOSURE OF THE INVENTION

Problems that the Invention is to Solve

However, the usual antenna unit and a method for enlarging a communication area has a plurality of problems as mentioned below.

That is, in the antenna unit and the method for enlarging the communication area disclosed in the Patent Document 1, as shown in FIG. 19, the antenna unit 101 only includes the loop antenna 111 provided on the antenna substrate 102 and the closed loop circuits (resonance circuits) 112 and 121. When the antenna unit 101 is installed in a free space (a wide space in which a structure such as metal does not exist in the periphery of a place where the antenna is installed), the antenna unit carries out a desired operation (a communication with an IC card). However, when the antenna unit is applied to an accommodating shelf or a display shelf for managing goods or books, the antenna unit 101 needs to be arranged in a place extremely near to the structure made of wood, a resin or metal that forms the accommodating shelf or the like. In this case, since a distance between the antenna unit 101 and the structure made of wood, the resin or the metal forming the accommodating shelf is extremely short, an antenna performance is terribly deteriorated. Especially, the influence of the metallic structure is large, so that the antenna impedance of the loop antenna 111 and the loop antenna 111 and the closed loop circuits (the resonance circuits) 112 and 121 is seriously affected by the metallic structure to be varied. Thus, a resonance frequency is varied or the input and output impedance of a reader/writer device is not matched with the impedance thereof Accordingly, an adjustment needs to be made for each time. Further, when an ordinary loop antenna 111, that is, a balanced type loop antenna comes closely especially to the metallic structure, the antenna has a feature near to a short (a short-circuit state) in view of high frequency and the impedance of the antenna exceedingly comes near to zero, deviates from an adjusting range and is not matched with the impedance of a subsequent circuit side. Therefore, a sufficient electric power cannot be supplied to the IC card from the antenna unit 101. As a result, a communication distance is extremely shortened or a communication cannot be performed. In the worst case, a fatal problem arises that a trouble such as the breakage of a transmitting circuit of the reader/writer device is generated.

Further, in the antenna unit and the method for enlarging the communication area disclosed in (the Patent Document 1), the closed loop circuit (the resonance circuit) is described as a closed loop circuit formed by connecting a coil to a condenser. Namely, the closed loop circuit is a parallel resonance circuit (a closed circuit) itself including the coil and the condenser, and the impedance of the parallel resonance circuit is ordinarily a high impedance as high as several hundred to several KΩ. Since the closed loop circuit has the high impedance, it is to be understood that the value of electric current supplied to the closed loop circuit is small. Further, since a matched load is not connected to the circuit, a standing wave is generated due to a mismatching. Thus, an operation is unstable and a mismatching loss is generated. Accordingly, the electric current is more reduced and the density of a magnetic flux re-radiated from the closed loop circuit is more reduced, so that the efficiency of the entire part of the antenna unit is greatly lowered.

Further, when the communication range needs to be more widened, even if the closed loop circuits are further continuously arranged, a fatal problem arises that the magnetic flux hardly reaches the closed loop circuit at a terminal end.

Thus, the present invention relates to a non-contact IC card reading and writing part excellent in its extensibility and convenience that solves the above-described problems, greatly reduces the influence of a structure made of metal in the periphery of a place where a loop antenna unit is installed, satisfies stable reading and writing characteristics and can enlarge a communication range by a simple method.

Means for Solving the Problems

A first invention according to the present invention concerns a loop antenna unit having a plurality of loop antennas. The loop antenna unit comprises: a first loop antenna to which an electric current is fed and a second loop antenna surrounding the first loop antenna to which the electric current is not fed. According to this structure, while the non-electric current fed loop antenna is installed adjacently to the loop antenna unit, when the electric current is fed only to the first loop antenna, the first loop antenna can be electro-magnetically coupled to the non-electric current fed loop antenna by a mutual induction by making the second loop antenna function as a buffer. Accordingly, even if a plurality of non-electric current fed loop antennas are increased, the variation of the resonance frequency of the first loop antenna can be suppressed. As a result, a matching of impedance of the loop antenna unit may not need to be adjusted.

A second invention according to the present invention concerns the loop antenna unit defined in the first invention. The loop antenna unit further comprises a grounded metal member. The first loop antenna and the second loop antenna are connected to the metal member. According to this structure, since an influence to the characteristics of the antenna by structures (for instance, formed with metal, wood and a resin) existing in the vicinity of a place where the loop antenna unit is installed or unnecessary noise from the neighborhood can be reduced, the change of a reference potential (ground potential) can be reduced.

A third invention according to the present invention concerns the loop antenna unit defined in the second invention. The loop antenna unit further comprises: a single grounding cable for connecting the first loop antenna and the second loop antenna to the metal member. According to this structure, while the change of the reference potential (ground potential) is reduced, the number of parts of the loop antenna unit can be restricted.

A fourth invention according to the present invention concerns the loop antenna unit defined in the second or third invention. The loop antenna unit further comprises: a magnetic member disposed between the first loop antenna and the second loop antenna and the metal member. According to this structure, when an electric current is fed to an inner loop antenna, most of generated magnetic flux is allowed to pass through the magnetic member so that the magnetic flux can be prevented from passing through the metal member. Thus, an eddy current due to the passage of the magnetic flux can be prevented from being generated in the metal member. As a result, while an influence by the metal in the periphery is hardly received, a loss of a magnetic filed is reduced, so that a magnetic field strength can be improved.

A fifth invention according to the present invention concerns the loop antenna unit defined in any one of the first to fourth inventions. The loop antenna unit further comprises: a first circuit unit including a resonance circuit and a matching circuit connected to the first loop antenna and a second circuit unit including a resonance circuit, a matching circuit and a matched load connected to the second loop antenna. According to this structure, a constant (for instance, a resistance value) of the matched load is set so that the resonance frequency can be prevented from changing from a communication frequency (for instance, 13.56 MHz). Thus, since the generation of a standing wave due to a mismatching can be suppressed, the antenna having little loss can be operated in a stable manner. Consequently, a highly efficient and stable performance can be ensured that re-radiates an electromagnetic field by an electromagnetic induction.

A sixth invention according to the present invention concerns a radio communication medium processor. The radio communication medium processor comprises: the loop antenna unit defined in any one of the first to fifth inventions; and a reading and writing part connected to the first loop antenna of the loop antenna unit to carry out at least one of processes of reading and writing information stored in a radio communication medium through the first loop antenna. A signal current from the reading and writing part is fed only to the first loop antenna. According to this structure, the loop antenna unit can be provided in which the variation of the resonance frequency can be suppressed.

A seventh invention according to the present invention concerns the radio communication medium processor defined in the sixth invention. The radio communication medium further comprises a third loop antenna to which an electric current is not fed and the third loop is arranged adjacently to the loop antenna unit according to any one of the first to fifth inventions. According to this structure, while a matching of the impedance of the loop antenna unit does not need to be adjusted, a communication range can be extended.

An eighth invention according to the present invention concerns a loop antenna unit including a loop antenna communicating with a radio communication medium and having a pair of opening end parts at both ends and a metal member arranged closely to the loop antenna, wherein the metal member is electrically connected to one of the opening end parts of the loop antenna with a space about 1/200 to 1/4000 times as long as the wavelength of a communication frequency. Accordingly, the impedance of the antenna can be adjusted by the metal member, the reference potential (ground potential) of the antenna can be stabilized and an influence to antenna characteristics by metal in the periphery of a place where the loop antenna unit is installed can be greatly reduced.

A ninth invention according to the present invention concerns the loop antenna unit defined in the eighth invention, wherein the loop antenna supplies an electric power and transmit data to the radio communication medium in accordance with an electromagnetic induction and obtains receive data from the radio communication medium in accordance with a load variation. Thus, the reference potential can be stabilized and a communication with the radio communication medium can be realized.

A tenth invention according to the present invention concerns the loop antenna unit defined in the eighth or ninth inventions, wherein the metal member is arranged substantially in parallel with a main surface of the loop antenna. Thus, the decrease of the influence to the antenna characteristics can be more improved.

An eleventh invention according to the present invention concerns the loop antenna unit defined in any one of the eighth to tenth inventions, wherein a magnetic member is disposed between the loop antenna and the metal member. Thus, the magnetic field strength can be improved and a thinned loop antenna can be realized.

A twelfth invention according to the present invention concerns the loop antenna unit defined in the eleventh invention, wherein the magnetic member is disposed substantially in parallel with the main surface of the loop antenna. Thus, the improvement of the magnetic field strength can be more increased.

A thirteenth invention according to the present invention concerns the loop antenna unit according to any one of the eleventh to twelfth inventions, wherein the magnetic member is disposed with a prescribed space from the loop antenna and from the metal member. Thus, a mutual adverse influence can be prevented.

A fourteenth invention according to the present invention concerns the loop antenna unit defined in any one of the eighth to thirteenth inventions, wherein the area of the metal member is not smaller than about 1.1 times as large as the area of the opening part of the loop antenna. Thus, while a performance for extremely reducing the change of the antenna characteristics due to the existence of metal or non-metal in the periphery is maintained, the size of the loop antenna unit can be minimized to make the loop antenna unit compact.

A fifteenth invention according to the present invention concerns the loop antenna unit defined in any one of the eleventh to fourteenth inventions, wherein the magnetic member has flexibility. Thus, an impact resistance or durability can be improved.

A sixteenth invention according to the present invention concerns the loop antenna unit defined in any one of the eighth to fifteenth inventions, wherein one of the pair of the opening end parts is electrically connected to the metal member, an unbalanced type resonance circuit and a ground terminal of a matching circuit, and the other of the pair of the opening end parts is connected to the unbalanced type resonance circuit and a signal terminal of the matching circuit. Thus, the variation of the reference potential (ground potential) of the reading and writing part can be greatly decreased and the loop antenna unit having a stable performance strong for unnecessary noise from the periphery is provided.

A seventeenth invention according to the present invention concerns the loop antenna unit defined in any one of the eighth to fifteenth inventions, wherein one of the pair of the opening end parts is connected to a ground terminal of a reading and writing part for reading, writing or reading and writing data of the radio communication medium, and the other of the pair of the opening end parts is connected to a signal terminal of the reading and writing part. Thus, the variation of the reference potential (ground potential) of the reading and writing part can be greatly reduced and the loop antenna unit having a stable performance strong for unnecessary noise from the periphery is provided.

An eighteenth invention according to the present invention concerns the loop antenna unit defined in any one of the eighth to seventeenth inventions, wherein in the loop antenna unit, the loop antenna, the magnetic member, the metal member, a first isolating member disposed between the loop antenna and the magnetic member and a second isolating member disposed between the magnetic member and the metal member are laminated. Thus, a miniaturized and thinned electric current fed loop antenna unit is provided.

A nineteenth invention according to the present invention concerns the loop antenna unit defined in the eighteenth invention, wherein the loop antenna is formed with a pattern conductor provided on an electronic board and the electronic board is laminated as the loop antenna. Thus, a miniaturized and thinned electric current fed loop antenna unit is provided.

A twentieth invention according to the present invention concerns the loop antenna unit defined in the nineteenth invention, wherein the resonance circuit and the matching circuit are formed on the electronic board. Thus, a miniaturized and thinned electric current fed loop antenna unit is provided.

A twenty first invention according to the present invention concerns the loop antenna unit defined in the eighteenth invention, wherein the loop antenna unit is stored in an accommodating case. Thus, a miniaturized and thinned electric current fed loop antenna unit is provided.

A twenty second invention according to the present invention concerns the loop antenna unit defined in any one of the eighth to seventeenth inventions, wherein the loop antenna unit is accommodated in a housing. Thus, the loop antenna unit that can be easily universally used can be realized.

A twenty third invention according to the present invention concerns the loop antenna unit defined in any one of the eighth to twenty second inventions, wherein a plurality of the loop antenna units are arranged linearly, in radial directions or on arrays substantially on the same planes. Thus, a range for communicating with the radio communication medium can be extended.

A twenty fourth invention according to the present invention concerns the loop antenna unit defined in the twenty third invention, wherein the plurality of the loop antenna units include electric current fed loop antenna units to which a signal current is fed and non-electric current fed loop antenna units to which the signal current is not fed. Thus, an erroneous recognition due to a phase shift for each of loop antennas is prevented and while a consumed electric power is reduced, the communication range can be extended.

A twenty fifth invention according to the present invention concerns a radio communication medium processor comprising: the plurality of the loop antenna units defined in any one of the eighth to twenty fourth inventions and the reading and writing part for reading, writing or reading and writing the data on the radio communication medium, wherein the plurality of the loop antenna units include the electric current fed loop antenna units to which the signal current is fed and the non-electric current fed loop antenna units to which the signal current is not fed. Thus, an erroneous recognition due to a phase shift for each of the loop antennas is prevented and while a consumed electric power is reduced, the communication range can be extended.

A twenty sixth invention according to the present invention concerns the radio communication medium processor defined in the twenty fifth invention, wherein the reading and writing part is connected only to the electric current fed loop antenna units among the plurality of loop antenna units. Thus, the consumed electric power is reduced and a miniaturization of the entire part of the device is realized.

Advantage of the Invention

According to the structure of the present invention, while the non-electric current fed loop antenna is installed adjacently to the loop antenna unit, when the electric current is fed only to the first loop antenna, the first loop antenna can be electro-magnetically coupled to the non-electric current fed loop antenna by a mutual induction by making the second loop antenna function as a buffer. Accordingly, even if a plurality of non-electric current fed loop antennas are increased, the variation of the resonance frequency of the first loop antenna can be suppressed. As a result, a matching of impedance of the loop antenna unit may not need to be adjusted.

Further, according to the structure of the present invention, in an accommodating shelf and a display shelf for carrying out a goods management and a book management, while the influence of a structure made of wood, a resin or metal forming the accommodating shelf in a place where the antenna is attached is greatly reduced and stable reading and writing characteristics are satisfied, a communication range can be easily enlarged. Thus, the radio communication medium processor excellent in its convenience and extensibility can be provided.

Especially, since the loop antenna unit is a grounded type loop antenna unit having the metal member in the loop antenna, under a state that the metal member exists, that is, under the state of an unbalanced loop antenna in which one end of the two opening ends of the loop antenna is electrically grounded in the metal member, the impedance of the antenna is previously adjusted. Accordingly, the reference potential (ground potential) of the antenna is stabilized and the variation of the antenna impedance can be minimized. Therefore, the influence to antenna characteristics by the peripheral structure is eliminated irrespective of the quality of a material such as wood, a resin or metal forming the accommodating shelf in the place where the loop antenna unit is installed and an adjustment may not be required during installing the loop antenna unit.

The electric current fed loop antenna unit and the non-electric current fed loop antenna unit using the grounded type loop antenna are prepared, so that the adjacent loop antennas are electro-magnetically coupled to each other by a mutual induction. The number of the non-electric current fed loop antenna units is merely increased and arranged closely together so that a communication range can be easily enlarged. It is to be understood that the non-electric current fed unit also eliminates the influence to the antenna characteristics by the peripheral structure and an adjustment is not necessary during installing the loop antenna unit.

Further, since the non-electric current fed loop antenna unit is connected to the matched load via the resonance circuit and the matching circuit of the loop antenna, the generation of a standing wave due to a reflected wave and the generation of a mismatching loss can be suppressed and the density of a re-radiated magnetic flux is more increased. Accordingly, the efficiency of all the loop antenna unit is very high and stable characteristics can be obtained and a total communication range can be greatly extended.

Further, since an electric current is not fed to the non-electric current fed loop antenna unit, the non-electric current fed loop antenna does not cause an excessively consumed electric power and gives no influence to other electronic device, so that an electric power can be saved. Further, the electric current fed loop antenna unit and the non-electric current fed loop antenna unit are laminated and a laminated structure is stored in a case, so that a thinned and miniaturized device can be realized and the device can be easily carried and installed. Further, durability and a weather resistance is improved, so that the device can be installed by simply placing it. Especially, when a communication range is desired to be changed, such a structure is particularly effective to increase the communication range to an optimum level.

Further, since the case in which the electric current fed loop antenna unit and the non-electric current fed loop antenna unit are stored is thin, the case can be easily disposed on the goods shelf or the like to communicate with the radio communication medium incorporated in the goods or the books and an external reading and writing part.

Thus, for instance, the inventory management of physical distribution warehouses or shops, the goods management of the display shelves of supermarkets or stationers and the document management of government and public offices and ordinary offices can be carried out, and the present invention can be applied to various systems, applications and businesses.

BRIEF DESCRIPTION OF THE DRAWINGS

FIG. 10(a) is an exploded view of the loop antenna unit in the first embodiment of the present invention.

FIG. 10(b) is a side sectional view of the loop antenna unit in the first embodiment of the present invention.

DESCRIPTION OF REFERENCE NUMERALS AND SIGNS

Figure 1:
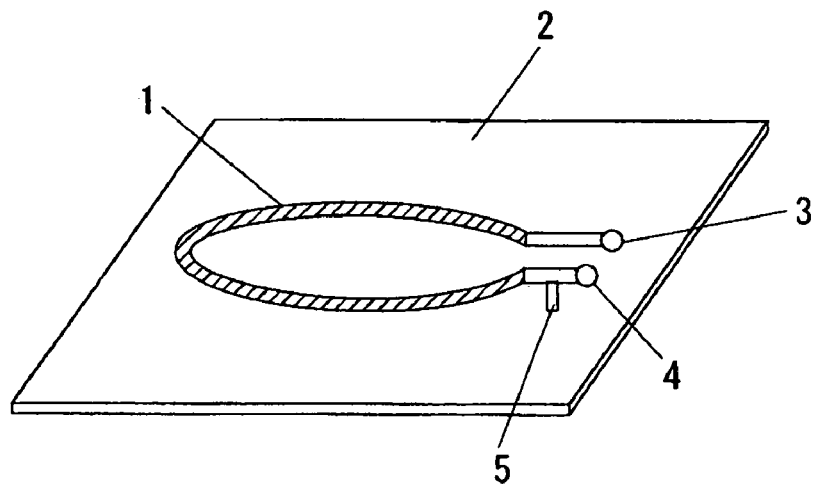
FIG. 1(a) is a perspective view of a first loop antenna unit in a first embodiment of the present invention.
FIG. 1(b) is a sectional view of the first loop antenna unit in the first embodiment of the present invention.
Figure 1:
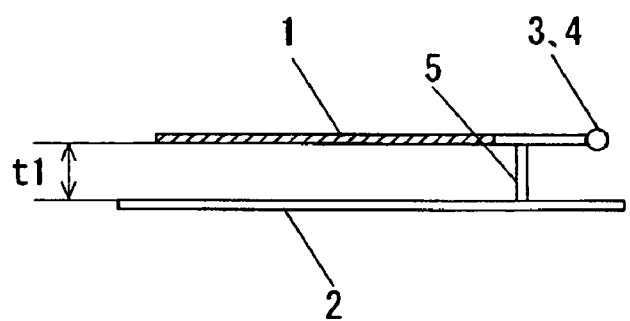
Figure 2:
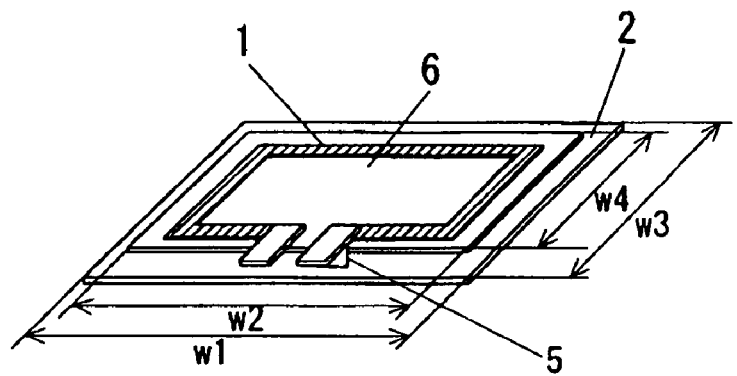
FIG. 2(a) is a perspective view of a second loop antenna unit in the first embodiment of the present invention.
FIG. 2(b) is a sectional view of the second loop antenna unit in the first embodiment of the present invention.
Figure 2:
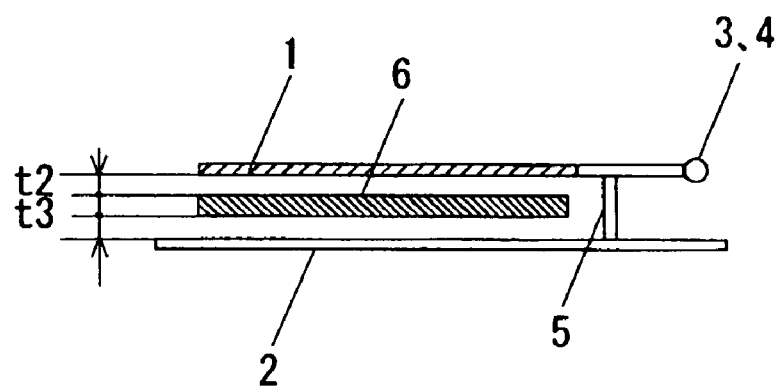

2 ... metal member
6 ... magnetic member
8 ... resonance circuit
9 ... matching circuit
10 ... matched load
12 ... reading and writing part
21 ... loop antenna unit
21a ... first loop antenna (inner loop antenna)
21b ... second loop antenna (outer loop antenna)
25 ... grounding cable
30 ... first circuit unit
31 ... second circuit unit
40 ... radio communication medium processor
41 ... radio communication medium processor Best Mode for Carrying Out the Invention Now, embodiments of the present invention will be described by using FIGS. 1 to 18. A radio communication medium in the present invention indicates a medium that can communicate with a processor without coming into contact with the processor, such as a non-contact IC card, an IC tag, an ID tag, an identifying label, an RF-ID tag, etc. The processor designates a device communicating with the radio communication media, what is called a reader/writer.

First Embodiment

FIG. 1(a) is a perspective view of a first loop antenna unit in a first embodiment of the present invention and FIG. 1(b) is a sectional view of the first loop antenna unit in the first embodiment of the present invention.

In FIGS. 1(a) and 1(b), 1 designates a loop antenna and 2 designates a metal member. 3 designates one end of opening end parts of the loop antenna 1 and 4 designates the other end of the opening end parts of the loop antenna 1. 5 designates an electric conductive wire rod, a plate material or a bar material to electrically ground a part near the opening end part of the loop antenna 1 in the metal member. Further, the loop antenna 1 is arranged in substantially parallel with the metal member 2 with a desired space t1 between them. The loop antenna 1 may be configured in a loop shape having an opening part in a center. The form thereof may be circular, substantially rectangular or polygonal. Further, a material of the loop antenna 1 may be suitably selected from among an electric conductive wire rod made of metal, a metallic plate material, a metallic foil material or a metallic tubular material. Further, the length of a loop of the loop antenna 1 is preferably set to about 1/10 to 1/100 times (220 to 2200 mm when a communication frequency is 13.56 MHz) as long as the wavelength of the communication frequency. The loop antenna 1 is preferably substantially parallel with the metal member 2, however, may not be substantially parallel with the metal member 2.

FIG. 2(a) is a perspective view of a second loop antenna unit in the first embodiment of the present invention.

FIG. 2(b) is a sectional view of the second loop antenna unit in the first embodiment of the present invention.

Figure 6:
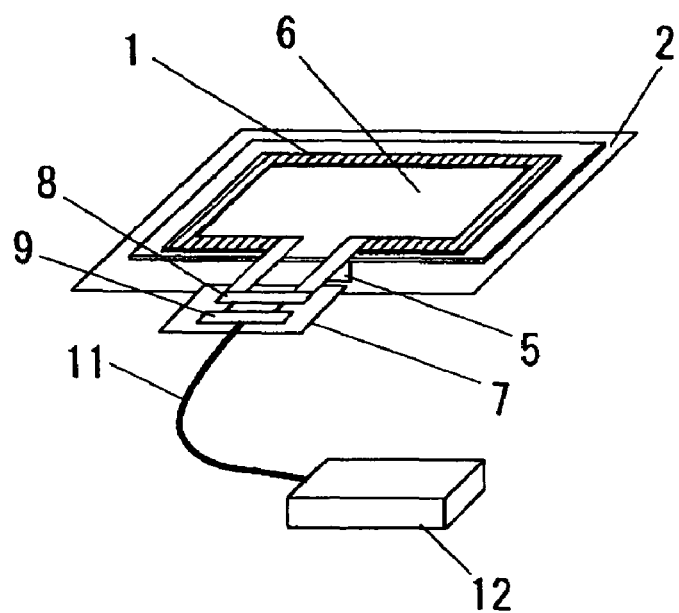
FIG. 6 is a perspective view of a second electric current fed loop antenna unit in the first embodiment of the present invention.

In FIGS. 2(a) and 2(b), 6 designates a magnetic member 6. The magnetic member 6 is arranged at a position of t2 from the back surface of the loop antenna 1 and at a position of t3 from the front surface of the metal member 2. As a material thereof, a sheet shaped or a plate shaped magnetic member is employed. As the sheet shaped or the plate shaped magnetic member, a ferrite core may be used, however, a magnetic sheet formed by kneading soft magnetic powder in an organic binder such as a resin material may be preferably used to decrease a weight. Further, the magnetic member 6 is obtained by mixing an organic solvent in ferrite powder, so that flexibility can be ensured and an impact resistance or durability can be improved. In the form of the magnetic member 6, the magnetic member 6 may be arranged in an entire surface including an area corresponding to the opening part of the loop antenna 1. However, the magnetic member 6 is formed in a loop shape (a doughnut shape) correspondingly to the form of the loop antenna 1, so that a quantity of use of the magnetic member can be reduced. When the magnetic sheet high in its cost is used, this form is especially preferable. As the metal member 2, a metallic flat plate may be employed. The metal member 2 is preferably larger than the loop antenna 1.

Further, when the metal member 2 has a size (area: W1×W3) about 1.1 times or more as large as that of the loop antenna 1, under a state that the metal member 2 is present, the impedance of the antenna is previously adjusted. Thus, the reference potential (ground potential) of the antenna can be stabilized and the impedance of the antenna does not change or a resonance frequency does not shift (deviation) due to the influence of metal in the periphery of a place where the loop antenna unit is installed so that the resonance frequency does not need to be adjusted. Therefore, when the size of the metal member 2 is set to at least about 1.1 times as large as the size of the loop antenna 1, while these performances are maintained, the size of a device can be minimized and the device can be miniaturized.

Figure 3:
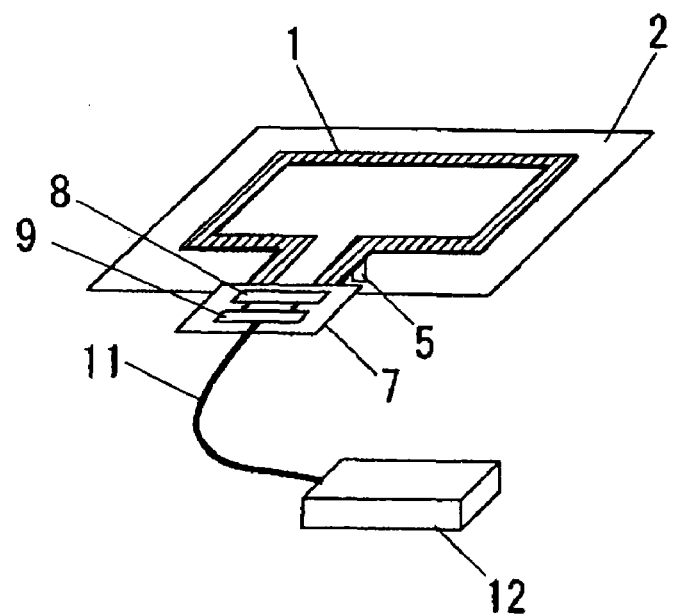
FIG. 3 is a perspective view of a first electric current fed loop antenna unit in the first embodiment of the present invention.

FIG. 3 shows a perspective view of a first electric current fed loop antenna unit in the first embodiment of the present invention. In the drawing, on a printed circuit board 7, a resonance circuit 8 and a matching circuit 9 are provided. In the electric current fed loop antenna unit, a ground terminal side of the electric conductive wire rod, the plate material or the bar material 5 of the opening end parts of the loop antenna 1 is connected to the ground side of the resonance circuit 8 and the matching circuit 9 and the other end 4 of the opening end parts of the loop antenna 1 is connected to the signal side of the resonance circuit 8 and the matching circuit 9. Then, the electric current fed loop antenna unit is connected to a transmitting and receiving circuit of a reading and writing part 12 via a transmitting cable such as a coaxial cable 11. According to this structure, the variation of the reference potential (ground potential) of the reading and writing part 12 can be greatly reduced, so that a stable performance strong for unnecessary noise from a neighborhood can be ensured.

Figure 4:
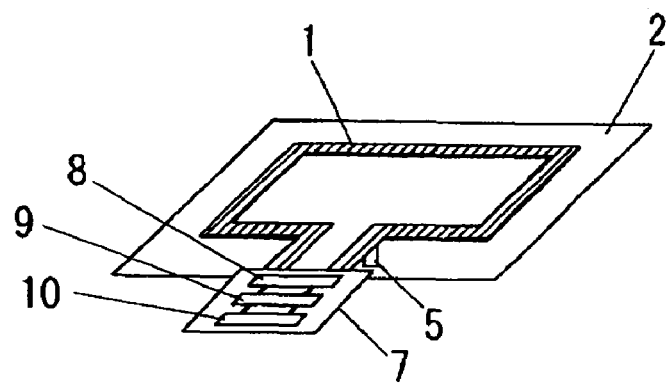
FIG. 4 is a perspective view of a first non-electric current fed loop antenna unit in the first embodiment of the present invention.

FIG. 4 shows a perspective view of a first non-electric current fed loop antenna unit in the first embodiment of the present invention. In the drawing, on a printed circuit board 7 a resonance circuit 8, a matching circuit 9 and a matched load 10 are provided. A ground terminal side of the electric conductive wire rod, the plate material or the bar material 5 of the opening end parts of the loop antenna 1 is connected to the ground side of the resonance circuit 8 and the matching circuit 9, and then, connected to one end of the matched load 10. The other end of the two opening end parts of the loop antenna 1 is connected to the signal side of the resonance circuit 8 and the matching circuit 9, and then, connected to the other end of the matched load 10. Thus, an influence to antenna characteristics by the metal in the periphery of a place where the loop antenna unit is installed is hardly received and the generation of a standing wave due to a mismatching is suppressed so that the antenna having a stable operation and little loss can be realized and a highly efficient and stable performance can be ensured that re-radiates an electromagnetic field by an electromagnetic induction.

In such a way, since the loop antenna 1 is hardly affected by the metal member 2, the space (the space corresponding to t1 shown in FIG. 1(b)) between the loop antenna 1 and the metal member 2 can be decreased. In this case, the space between the loop antenna 1 and the metal member 2 is preferably set to a value approximately 1/200 to 1/4000 times as long as the wavelength of the communication frequency (5.5 to 110 mm when the communication frequency is 13.56 MHz) in order to suppress the decrease of a communication distance and miniaturize a below-described radio communication medium device. That is, when the space is not larger than 5.5 mm, a quantity of an eddy current generated in the metal member 2 is increased. As a result, since a loss of a magnetic field is increased, the communication distance is extremely shortened. On the other hand, when the space is not smaller than 110 mm, a casing (not shown in the drawing) for accommodating the loop antenna 1 or the metal member 2 is enlarged, so that the size of the radio communication medium device is enlarged.

Figure 5:
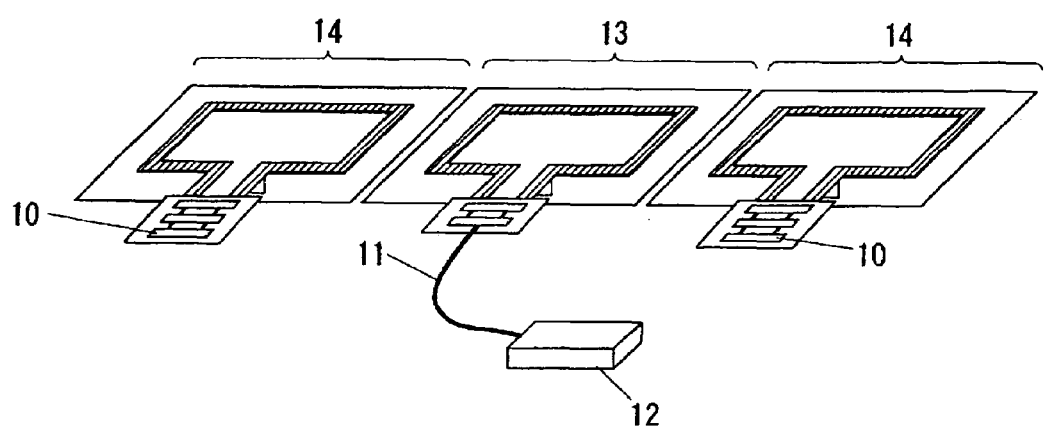
FIG. 5 is a perspective view showing a first using example in the first embodiment of the present invention.

FIG. 5 is a perspective view showing a first using example in the first embodiment of the present invention. In the drawing, 13 designates the first electric current fed loop antenna unit shown in FIG. 13, and 14 designates the first non-electric current fed loop antenna unit shown in FIG. 4. One example is shown in which the non-electric fed loop antenna units 14 are arranged at both sides adjacent to the electric current fed loop antenna unit 13.

FIG. 6 is a perspective view of a second electric current fed loop antenna unit in the first embodiment of the present invention.

Figure 7:
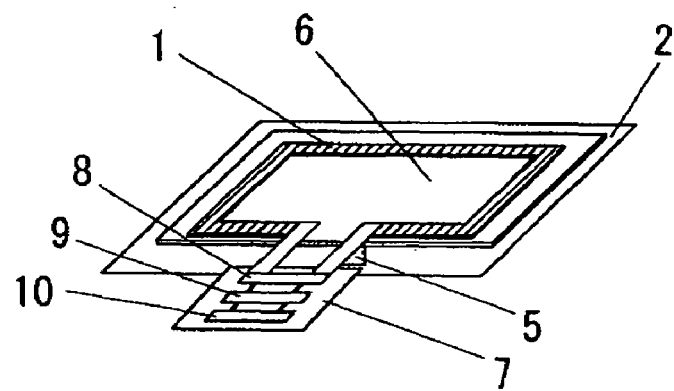
FIG. 7 is a perspective view of a second non-electric current fed loop antenna unit in the first embodiment of the present invention.

FIG. 7 is a perspective view of a second non-electric current fed loop antenna unit in the first embodiment of the present invention.

Figure 8:
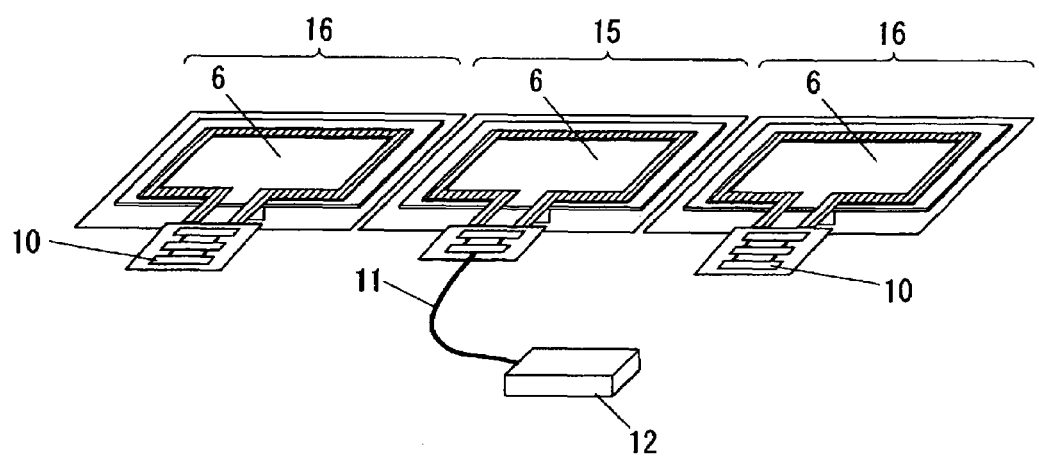
FIG. 8 is a perspective view showing a second using example in the first embodiment of the present invention.
Figure 9:
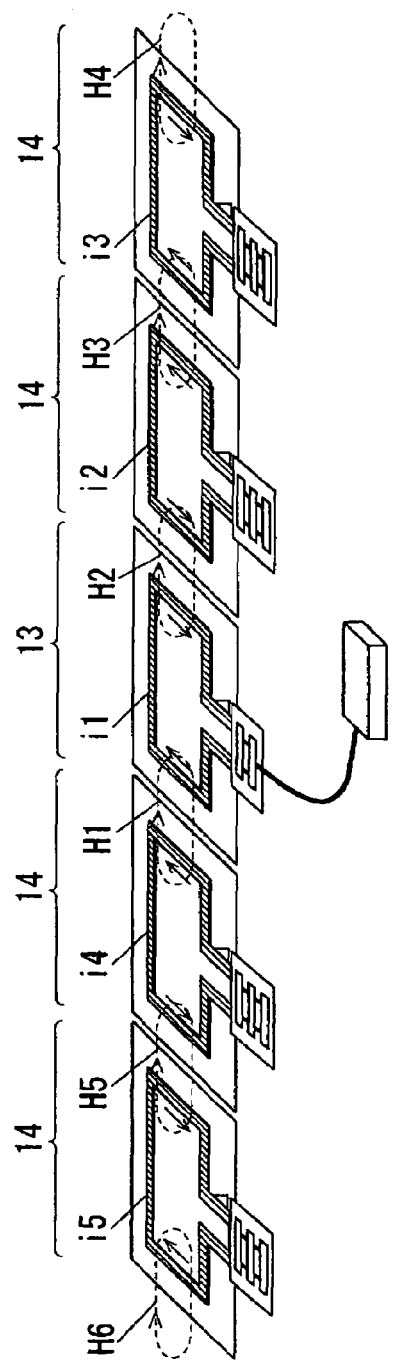
FIG. 9(a) is a perspective view of a radio communication medium device in the first embodiment of the present invention.
FIG. 9(b) is a sectional view of the radio communication medium device in the first embodiment of the present invention.
Figure 9:
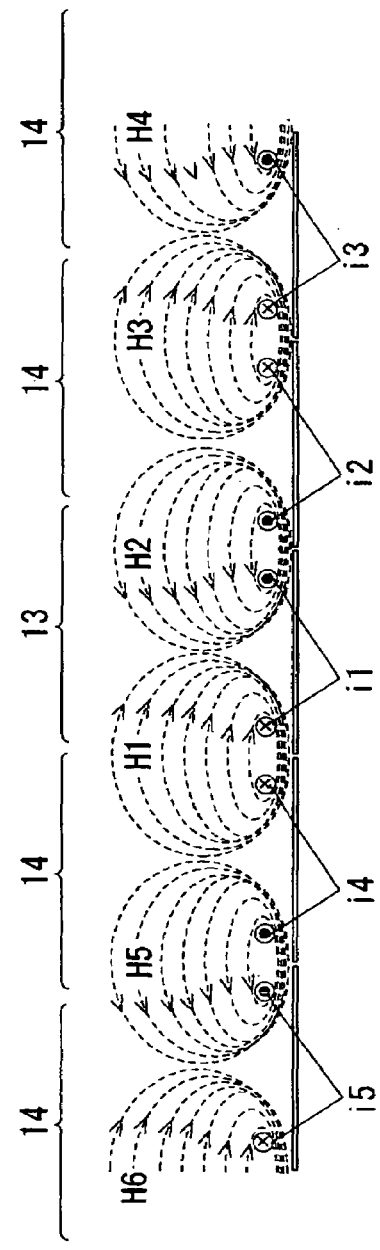

FIG. 8 is a perspective view showing a second using example in the first embodiment of the present invention.

In FIGS. 6 to 8, 6 designates a magnetic member and has an effect for decreasing the thickness of the loop antenna unit.

Now, an antenna of a radio communication medium processor in the first embodiment of the present invention will be described below in detail as well as the flow of a high frequency electric current and the flow of a magnetic flux.

FIG. 9(a) is a perspective view of the radio communication medium device in the first embodiment of the present invention. FIG. 9(b) is a sectional view of the radio communication medium device in the first embodiment of the present invention.

FIG. 9(a) shows an example in which two non-electric current fed loop antenna units 14 are respectively linearly arranged at both sides adjacent to the electric current fed loop antenna unit 13. The transmitting electric power and the transmitting signal of high frequency outputted from the transmitting circuit of the reading and writing part 12 are supplied to the matching circuit 9 of the electric current fed loop antenna unit 13 via the coaxial cable 1, and then, guided to the loop antenna 1 via the resonance circuit 8. At this time, in accordance with the effect of the matching circuit 9, the impedance of the transmitting circuit of the reading and writing part 12 and the coaxial cable 11 is sufficiently matched with the impedance of the resonance circuit 8, so that the generation of the standing wave is restricted and an electric current is efficiently fed to the antenna. Magnetic fluxes H1 and H2 generated by a high frequency current i1 supplied to the loop antenna 1 of the electric current fed loop antenna unit 13 respectively pass through the opening surfaces of the loop antennas 1 of the adjacent non-electric current fed loop antenna units 14. Thus, high frequency current i2 and i4 is respectively supplied to the loop antennas 1 of the non-electric current fed loop antenna units 14. Further, a magnetic flux H3 is generated by the high frequency current i2 and a magnetic flux H5 is generated by the high frequency current i4. Similarly, a high frequency current i3 is generated by the magnetic flux H3 and a high frequency current i5 is generated by the magnetic flux H5. Further, a magnetic flux H4 is generated by the high frequency current i3 and a magnetic flux H6 is generated by the high frequency current i5. As described above, the resonance circuit 8, the matching circuit 9 and the matched load 10 are provided in the loop antenna 1 of the non-electric current fed loop antenna unit 14, so that the generation of the standing wave due to a mismatching is suppressed to eliminate the existence of a reflected wave. Accordingly, the high frequency current is efficiently supplied to the loop antenna 1 to endlessly re-radiate the magnetic flux, which greatly contributes to the enlargement of a communication range.

FIG. 10(a) is an exploded view of the loop antenna unit in the first embodiment of the present invention and FIG. 10(b) is a side sectional view of the loop antenna unit in the first embodiment of the present invention.

As apparent from FIG. 10(b), the loop antenna (especially, when the loop antenna is formed on an electronic board, the decrease of thickness is more promoted) 1, the magnetic member 6, the metal member 2, a spacer as a first isolating member between the loop antenna 1 and the metal member 2 and a spacer as a second isolating member between the loop antenna 1 and the magnetic member 6 are laminated so that an extremely thin loop antenna unit can be realized.

Further, when the loop antenna 1 is formed by a pattern conductor on the electronic board, the matching circuit 9 or the resonance circuit 8 is also formed on the same electronic board. Thus, a thinner loop antenna unit can be realized.

Further, since the resonance circuit 8 and the matching circuit 9 are provided on the electronic board, in the non-electric current fed loop antenna unit 14, an unbalanced type resonance circuit 8, the matching circuit 9 and the matched load 10 are provided on the electronic board to realize a miniaturization, a thin form and a low cost. Further, both the electric current fed loop antenna unit 13 and the non-electric current fed loop antenna unit 14 can use a common casing made of a resin to achieve the low cost.

Further, the loop antenna 1, the first isolating member, the magnetic member 6, the second isolating member and the metal member 2 formed on the electronic board are sandwiched in between a resin casing (a main body) and a resin casing (a back cover). Thus, an easiness of assembly during a production is increased and an unevenness in performance can be reduced due to an improvement of a dimensional accuracy for positioning and assembling respective elements.

Second Embodiment

Figure 11:
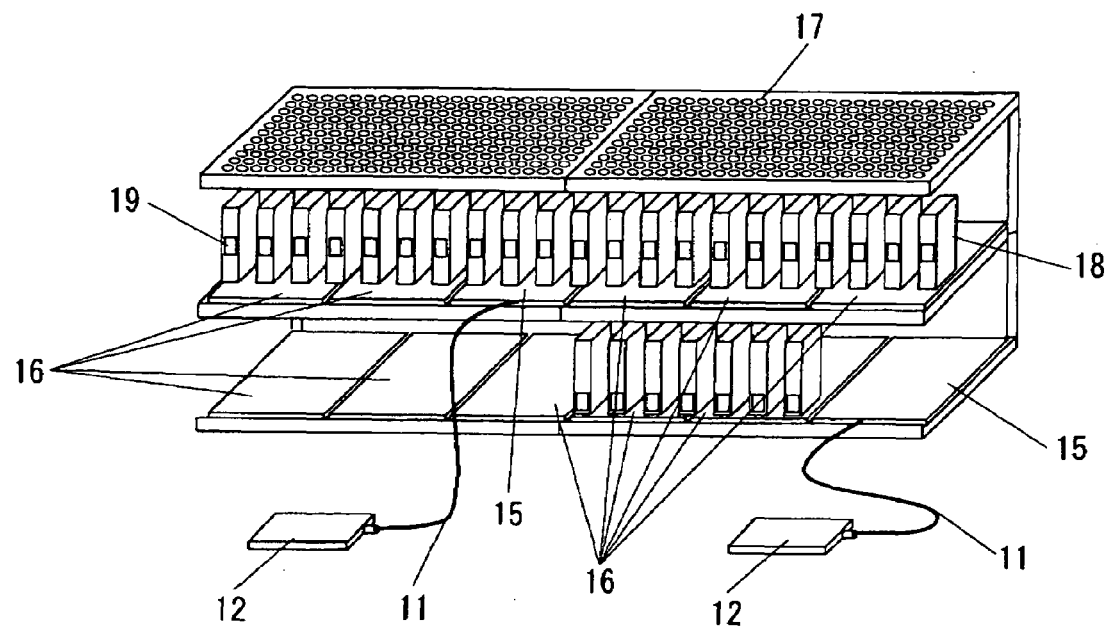
FIG. 11 is a perspective view showing a using example of a radio communication medium processor in a second embodiment of the present invention.

FIG. 11 is a perspective view showing a using example of a radio communication medium processor in a second embodiment of the present invention.

Figure 12:
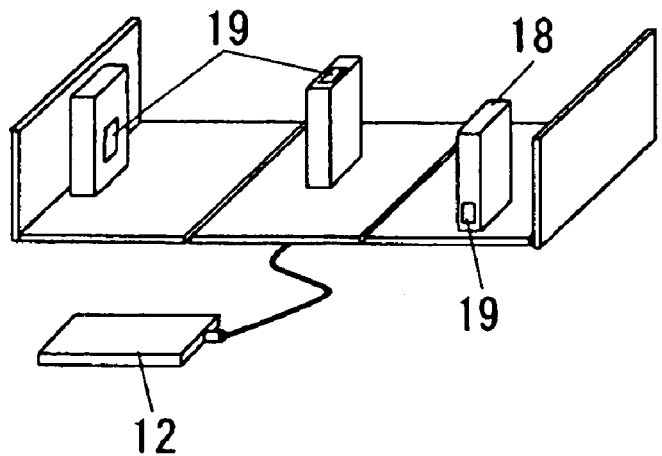
FIG. 12 is a perspective view showing a second using example of the radio communication medium processor in the second embodiment of the present invention.
Figure 12:
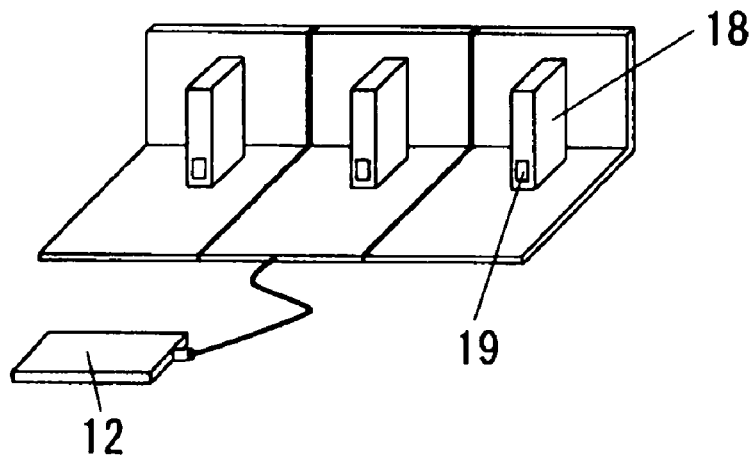
Figure 13:
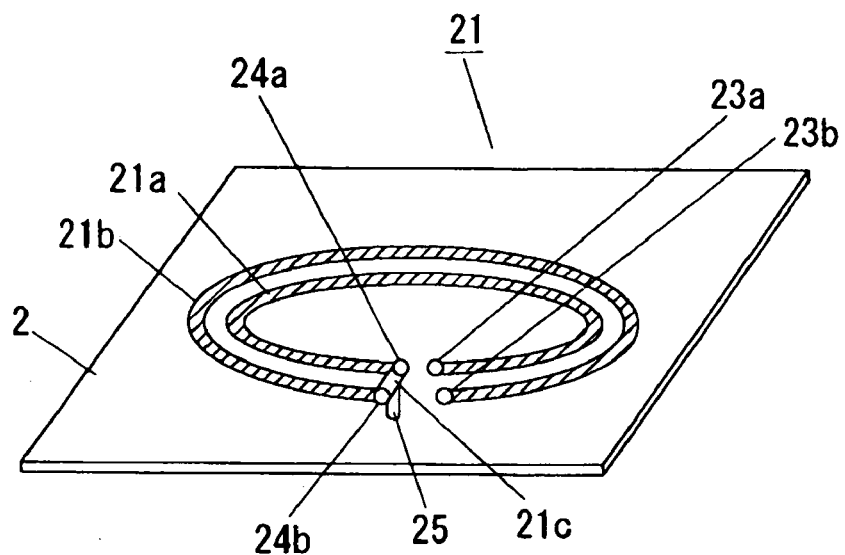
FIG. 13(a) is a perspective view of a loop antenna unit in a third embodiment of the present invention.
FIG. 13(b) is a side view of the loop antenna unit in the third embodiment of the present invention.
Figure 13:
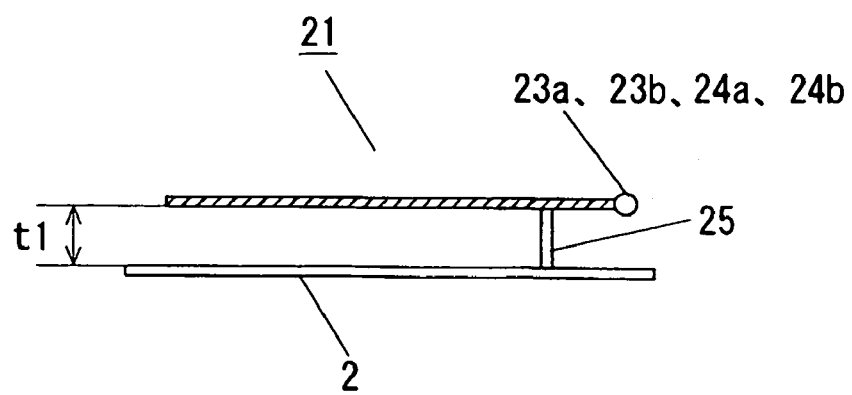

FIG. 12 is a perspective view showing a second using example of the radio communication medium processor in the second embodiment of the present invention.

FIG. 11 shows the first using example. In the drawing, on a goods shelf 17 made of wood, a resin or metal, goods or books 18 to which IC tags 19 are attached are placed. Between the goods shelf 17 and the goods or the books 18, electric current fed loop antenna units 15 and non-electric current fed loop antenna units 16 are arranged in a relation of 1 to N (N≦1). In an example of an arrangement, on an upper shelf in the drawing, the electric current fed loop antenna unit 15 is arranged in the vicinity of a central part, and on a lower shelf in the drawing, the electric current fed loop antenna unit 15 is arranged in a side. In such a way, since the radio communication medium device is simply placed on the metallic goods shelf 17 to require no adjustment, the radio communication radio medium device is excellent in its convenience and extensibility of a communication range and having stable characteristics.

FIGS. 12(a) and 12(b) show the second using example. FIG. 12(a) shows one example that the non-electric current loop antenna units are vertically arranged on both side surfaces and FIG. 12(b) shows one example that the non-electric current fed loop antenna units are vertically arranged on a rear surface. In such a way, the radio communication medium device has an advantage that the communication range can be simply extended not only in planar directions, but also in three-dimensional directions.

Third Embodiment

FIG. 13(a) is a perspective view of a loop antenna unit in a third embodiment of the present invention and FIG. 13(b) is a side view of the loop antenna unit in the third embodiment of the present invention.

A loop antenna unit 21 has an inner loop antenna 21a (a first loop antenna) and an outer loop antenna 21b (a second loop antenna) as shown in FIG. 13(a). The outer loop antenna 21b surrounds the outer periphery of the inner loop antenna 21a. The inner loop antenna 21a and the outer loop antenna 21b are arranged on the same plane as shown in FIG. 13(a). However, when the outer loop antenna 21b is arranged so as to surround the inner loop antenna 21a, the outer loop antenna 21b and the inner loop antenna 21a are not necessarily arranged on the same plane. As described below, when an electric current is fed only to the inner loop antenna 21a, if the inner loop antenna 21a is magnetically connected to the outer loop antenna 21b, they may be arranged on different planes.

Further, as shown in FIG. 13(a), the loop antenna unit 21 includes a folded back part 21c, a metal member 2 and a grounding cable 25. One terminal of the inner loop antenna 21a is connected to one terminal of the outer loop antenna 21b through the folded back part 21c. The folded back part 21c is made of an electric conductive material. The form of the folded back part may be any of a linear shape, a plate shape or a rod shape. The folded back part 21c is connected to the metal member 2 through the grounding cable 25. The grounding cable 25 is made of an electric conductive material like the folded back part 21c. The form of the grounding cable may be any of a linear shape, a plate shape or a rod shape. The metal member 2 is made of a rectangular plate material. The inner loop antenna 21a and the outer loop antenna 21b are arranged substantially in parallel with the metal member 2 with a desired space t1 as shown in FIG. 13(b).

The inner loop antenna 21a and the outer loop antenna 21b forming the loop antenna unit 21 may be configured in loop shapes having opening parts in centers. The forms thereof may be circular, substantially rectangular or polygonal. Further, a material of the inner loop antenna 21a and the outer loop antenna 21b may be suitably selected from among an electric conductive wire rod made of metal, a metallic plate material, a metallic foil material or a metallic tubular material. Further, the length of loops of the inner loop antenna 21a and the outer loop antenna 21b is preferably set to about 1/10 to 1/100 times (220 to 2200 mm when a communication frequency is 13.56 MHz) as long as the wavelength of the communication frequency. It is to be understood that the dimensional relation of the length of the loop antennas 21a and 21b shows a relation of the inner loop antenna 21a<the outer loop antenna 21b.

Further, as shown in FIG. 13(a), the inner loop antenna 21a has two terminals 23a and 24a. Between the two terminals 23a and 24a, a resonance circuit and a matching circuit (described below) are provided that are not shown in the drawing. Specifically, the terminal 23a is connected to the ground side of the resonance circuit and the matching circuit and the terminal 24a is connected to the signal side of the resonance circuit and the matching circuit. The resonance circuit and the matching circuit are connected to a reading and writing part (described below) not shown in the drawing that carries out at least one of processes of reading and writing information stored in a radio communication medium such as an RF-ID (RADIO FREQUENCY IDENTIFICATION) or an electronic tag via a transmitting cable such as a coaxial cable (described below) not shown in the drawing.

According to this structure, since an influence to antenna characteristics by structures (made of, for instance, metal, wood or a resin) present in the vicinity of a place where the loop antenna unit is installed or unnecessary noise from a neighborhood can be reduced, the variation of the reference potential (the ground potential) of the reading and writing part can be reduced.

Further, the outer loop antenna 21b has two terminals 23b and 24b like the inner loop antenna 21a. Between the two terminals 23b and 24b, a resonance circuit, a matching circuit and a matched load are provided that are not shown in the drawing. Specifically, the terminal 23b is connected to the ground side of the resonance circuit and the matching circuit and to one end of the matched load. The terminal 24b is connected to the signal side of the resonance circuit and the matching circuit, and to the other end of the matched load.

In this structure, while a below-described non-electric current fed loop antenna (a third loop antenna) that is not shown in the drawing is installed adjacently to the loop antenna unit 21, when the electric current is fed only to the inner loop antenna 21a, the inner loop antenna 21a can be electro-magnetically coupled to the non-electric current fed loop antenna by a mutual induction by making the outer loop antenna 21b function as a buffer. Accordingly, even if a plurality of the non-electric current fed loop antennas are increased, the variation of the resonance frequency of the first loop antenna can be suppressed. As a result, while a communication range can be simply extended, a matching of impedance of the loop antenna unit 21 may not need to be adjusted.

Further, since the loop antenna unit 21 has a folded back loop antenna structure, a work such as a stamping work can be carried out to increase an easiness of production and assembly and the improvement of a dimensional accuracy for assembling respective elements makes it possible to reduce an unevenness in performance. Further, it is to be understood that even when a part near the central parts of the folded back part 21c and the grounding cable 25 is divided into two to form two independent grounded type loops, there is no change in electric characteristics.

The outer loop antenna 21b and the inner loop antenna 21a may be configured in loop shapes having opening parts in their centers and a pair of opening end parts. The forms thereof may be circular, substantially rectangular or polygonal. Further, a material of the inner loop antenna 21a and the outer loop antenna 21b may be suitably selected from among an electric conductive wire rod made of metal, a metallic plate material, a metallic foil material or a metallic tubular material.

Fourth Embodiment

Figure 14:
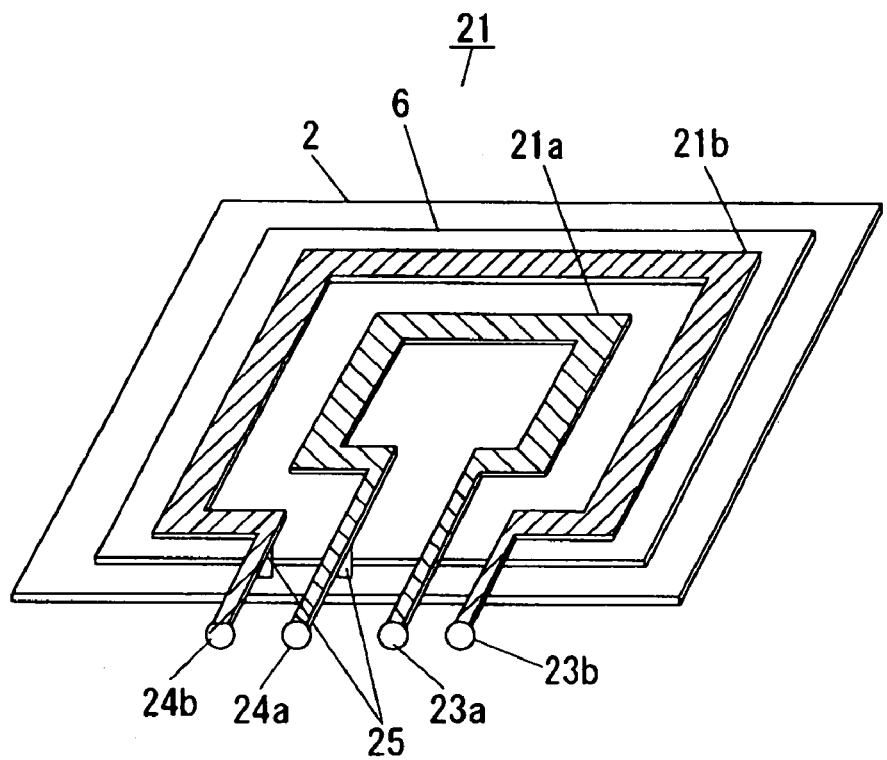
FIG. 14(a) is a perspective view showing a loop antenna unit in a fourth embodiment of the present invention.
FIG. 14(b) is a side view of the loop antenna unit in the fourth embodiment of the present invention.
Figure 14:
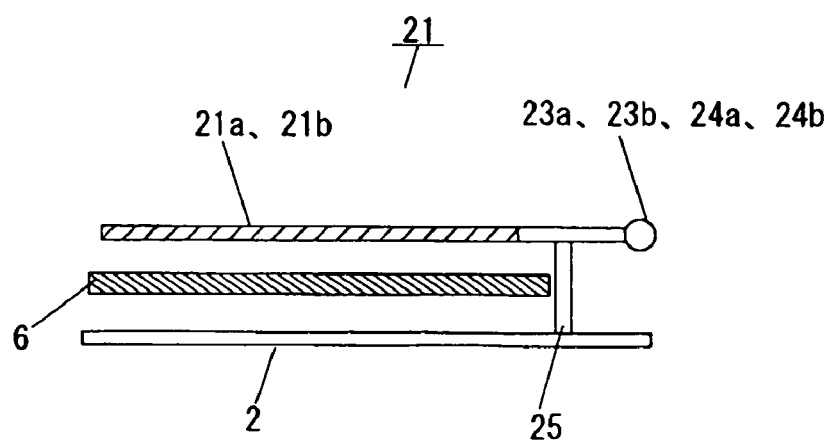

FIG. 14(a) is a perspective view showing a loop antenna unit in a fourth embodiment of the present invention. FIG. 14(b) is a side view thereof In FIG. 14, the same elements as those of the fourth embodiment are designated by the same reference numerals and an explanation thereof is omitted.

A loop antenna unit 21 shown in FIG. 14 is different from the third embodiment and composed of two independent grounded type loops. An inner loop antenna 21a and an outer loop antenna 21b are configured to rectangular forms. The inner loop antenna 21a and the outer loop antenna 21b are respectively provided with grounding cables 25 made of an electric conductive wire rod, a plate material or a bar material. For the purpose of easily understanding the present invention, in FIG. 14(b), a member for supporting a below-described magnetic member 6 is omitted.

Terminals 24a and 24b in a ground side of terminals of the inner loop antenna 21a and the outer loop antenna 21b are electrically connected to a metal member 2, so that an influence to antenna characteristics by metal in the periphery of a place where the loop antenna unit is installed can be hardly received. Further, the inner loop antenna 21a and the outer loop antenna 21b are arranged substantially in parallel with the metal member 2 with a desired space between them. The inner loop antenna 21a and the outer loop antenna 21b are preferably arranged substantially in parallel with the metal member 2, however, are not necessarily arranged substantially in parallel with the metal member 2.

The metal member 2 may employ a metallic flat plate and is preferably larger than the outer loop antenna 21b.

Further, the loop antenna unit 21 has the magnetic member 6 as shown in FIG. 14. The magnetic member 6 is disposed between the inner loop antenna 21a and the outer loop antenna 21b and the metal member 2. According to this structure, when an electric current is fed to the inner loop antenna 21a, most of generated magnetic flux is allowed to pass through the magnetic member 6 so that the magnetic flux can be prevented from passing through the metal member 2. Thus, an eddy current due to the passage of the magnetic flux can be prevented from being generated in the metal member 2. As a result, while an influence by the metal in the periphery is hardly received, a loss of a magnetic filed is reduced, so that a magnetic field strength can be improved.

Fifth Embodiment

Figure 15:
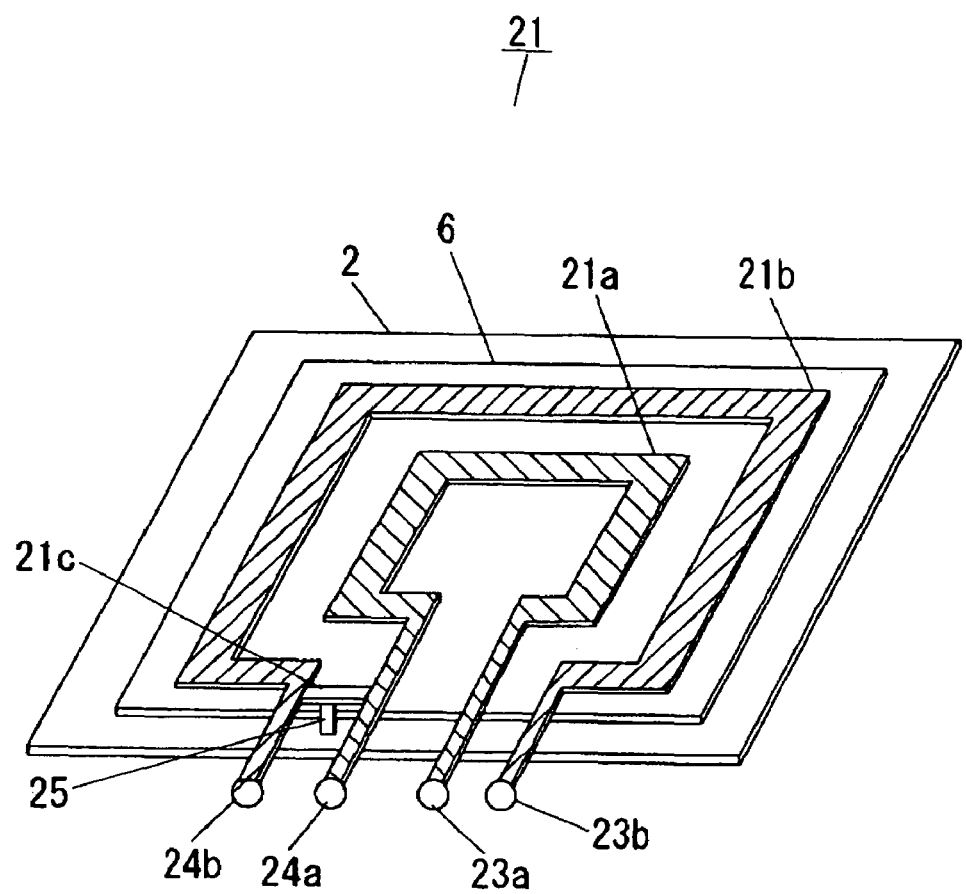
FIG. 15 is a perspective view showing a loop antenna unit in a fifth embodiment of the present invention.

FIG. 15 is a perspective view showing a loop antenna unit in a fifth embodiment of the present invention.

In the fifth embodiment, a loop antenna unit 21 has a common cable 21c for connecting together terminals 24a and 24b of a ground side. The common cable 21c is connected to a metal member 2 through a single grounding cable 25. Thus, since an inner loop antenna 21a and an outer loop antenna 21 can share the grounding cable 25, while the increase of the number of parts is restricted, the variation of a reference potential (a ground potential) is reduced. Accordingly, the loop antenna unit 21 can have a stable performance strong for unnecessary noise from a neighborhood.

Sixth Embodiment

Figure 16:
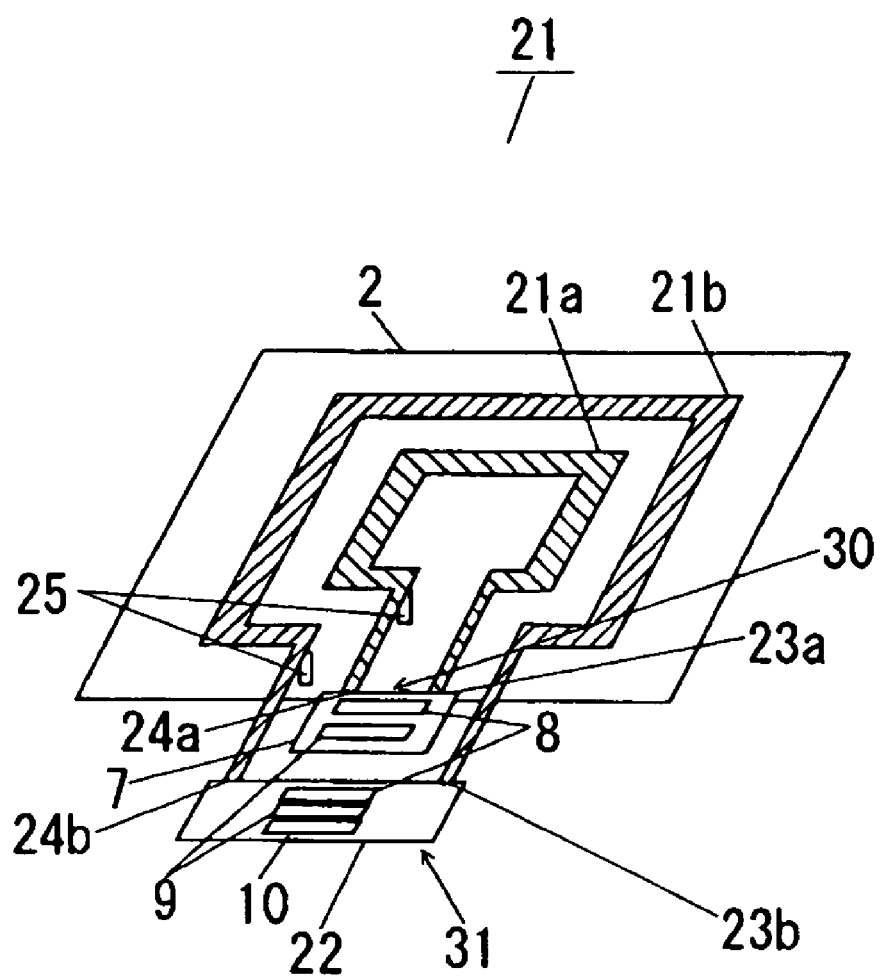
FIG. 16 is a perspective view showing a loop antenna unit in a sixth embodiment of the present invention.

FIG. 16 is a perspective view showing a loop antenna unit in a sixth embodiment in the present invention. In FIG. 16, the same elements as those of the third to fifth embodiments are designated by the same reference numerals and an explanation thereof is omitted.

A loop antenna unit 21 has a structure that a resonance circuit, a matching circuit and a matched load are connected to the loop antenna unit of the fourth embodiment. Specifically, as shown in FIG. 16, an inner loop antenna 21a has a first circuit unit 30. The first circuit unit 30 includes a circuit board 7. On the circuit board 7, the resonance circuit 8 and the matching circuit 9 are mounted. The matching circuit 9 is a circuit for matching and composed of, for instance, a parallel circuit of a condenser and a resistance. The ground side of the resonance circuit 8 and the matching circuit 9 is connected to a grounding cable 25 and a terminal 24a. On the other hand, the signal side of the resonance circuit 8 and the matching circuit 9 is connected to a terminal 23a.

As shown in FIG. 16, an outer loop antenna 21b has a second circuit unit 31. The second circuit unit 31 includes a circuit board 22. On the circuit board 22, a resonance circuit 8 and a matching circuit 9 are mounted like the above-described circuit board 7. The ground side of the resonance circuit 8 and the matching circuit 9 is connected to a grounding cable 25 and a terminal 24b. On the other hand, the signal side of the resonance circuit 8 and the matching circuit 9 is connected to a terminal 23b.

On the circuit board 22, not only the resonance circuit 8 and the matching circuit 9, but also a matched load 10 is mounted differently from the above-described circuit board 7. The matched load 10 is a resistance such as a chip resistance element. A resistance value of the matched load 10 is previously set to a prescribed value (for instance, a value of the order of kΩ) with which a matching can be made so that the resonance frequency of the inner loop antenna 21a serving as a feeding side is not varied from a communication frequency (for instance 13.56 MHz).

For instance, during the shipment of the loop antenna unit or immediately after the loop antenna unit is installed, the resistance value is set as described above, and accordingly, the resonance frequency can be prevented from changing from the communication frequency (for instance, 13.56 MHz). Thus, a matching of impedance does not need to be adjusted. Consequently, since the generation of a standing wave due to a mismatching can be suppressed, the antenna having a stable operation and little loss can be operated in a stable manner, so that a highly efficient and stable performance can be ensured that re-radiates an electromagnetic field by an electromagnetic induction.

In the sixth embodiment, the structure is described that a magnetic member is not provided between the loop antennas 21a and 21b and a metal member 2 differently from the fourth and fifth embodiments. However, the magnetic member may be provided like the fourth and fifth embodiments. In such a way, the same effects as those of the fourth and fifth embodiments can be realized.

Seventh Embodiment

Figure 17:
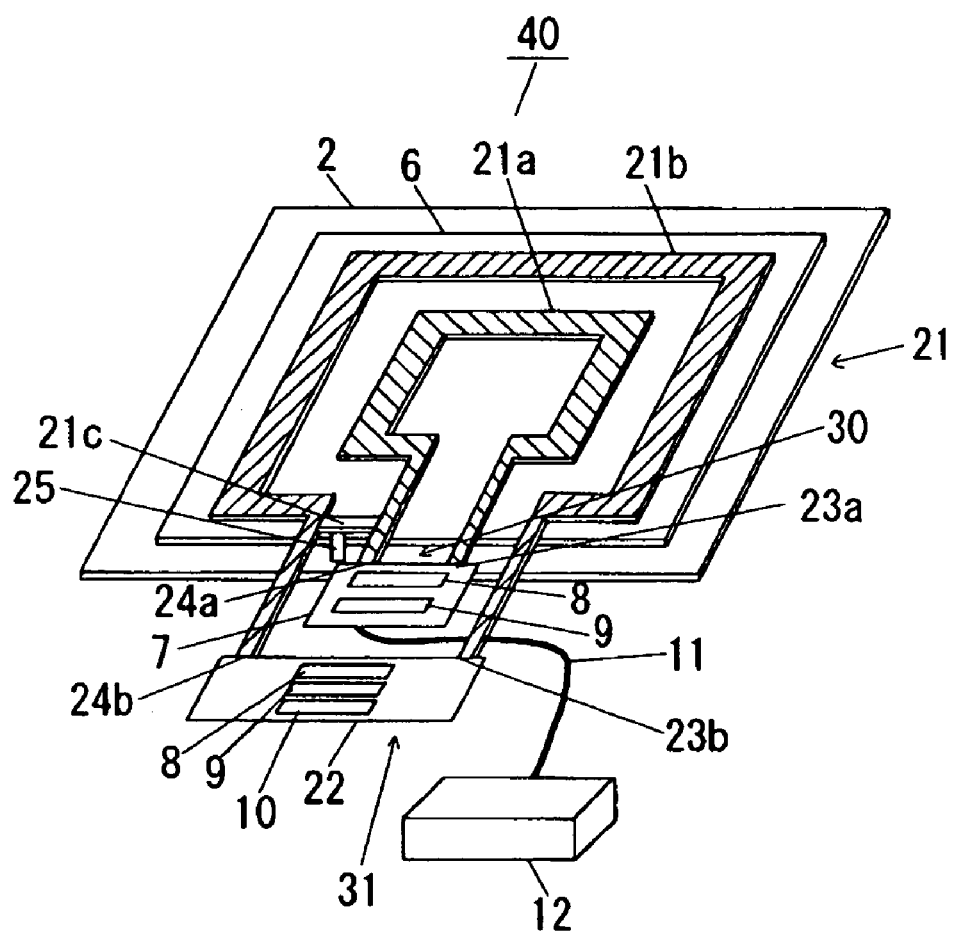
FIG. 17 is a perspective view showing a radio communication medium device in a seventh embodiment of the present invention.

FIG. 17 is a perspective view showing a radio communication medium device in a seventh embodiment of the present invention. A radio communication medium processor 40 has, as shown in FIG. 17, a loop antenna unit 21 and a reading and writing part 12. In the loop antenna unit 21, the circuit units 30 and 31 shown in the sixth embodiment are connected to the loop antenna unit 21 (see FIG. 15) shown in the fifth embodiment. The signal side of the resonance circuit 8 and the matching circuit 9 mounted on the circuit board 7 is connected to a transmitting and receiving circuit (not shown in the drawing) of the reading and writing part 12 via a transmitting cable 11 such as a coaxial cable. The reading and writing part 12 carries out at least one of processes of reading and writing information stored in a radio communication medium such as an RF-ID or an electronic tag.

Eighth Embodiment

Figure 18:
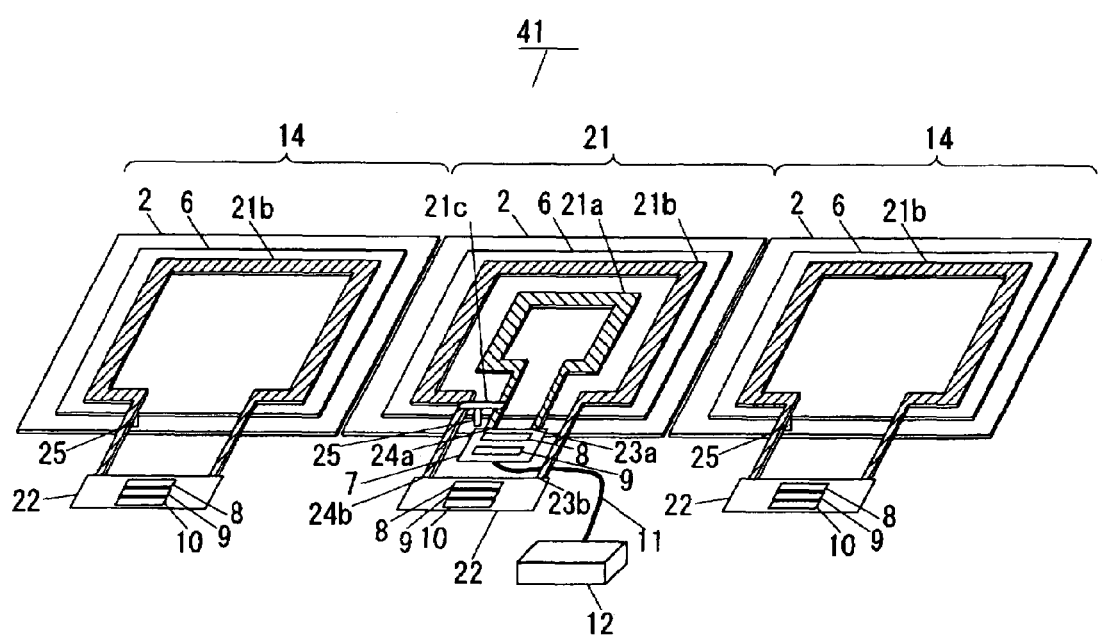
FIG. 18 is a perspective view showing a using example of a radio communication medium processor in an eighth embodiment of the present invention.
Figure 19:
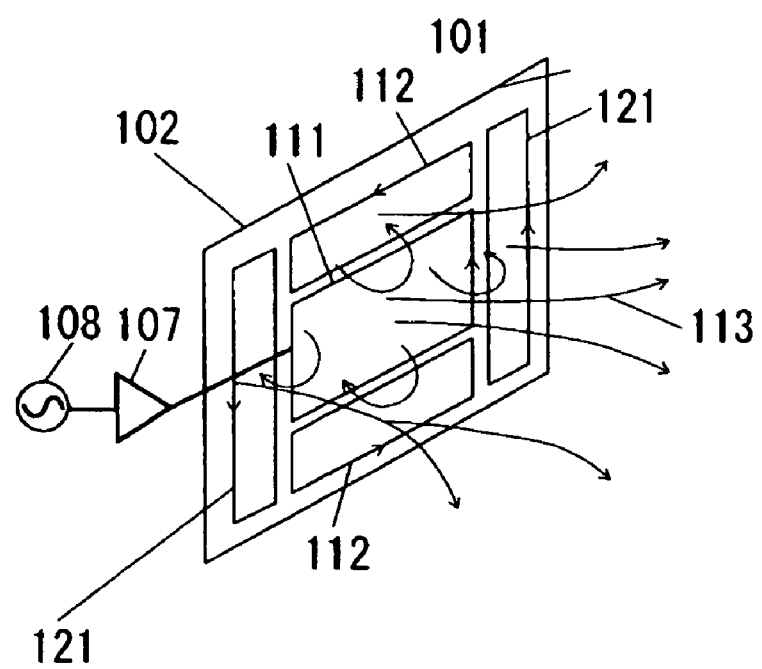
FIG. 19 is a perspective view of an antenna unit in a related art.

FIG. 18 is a perspective view showing a using example of a radio communication medium processor in an eighth embodiment of the present invention. A radio communication medium processor 41 includes, as shown in FIG. 18, a loop antenna unit 21 and non-electric current fed loop antennas (third loop antennas) 14 to which an electric current is not fed. Two non-electric current fed loop antennas 14 are provided and arranged adjacently to both sides of the loop antenna unit 21. Since the non-electric fed loop antenna 14 has the same structure as that of the outer loop antenna 21b shown in FIG. 16, an explanation of the structure is omitted.

In FIG. 18, the two non-electric current fed loop antennas 14 are provided, however, one non-electric current fed loop antenna may be provided or a plurality of non-electric current fed loop antennas 14 may be provided respectively in the right and left sides of the loop antenna unit 21. The plurality of the non-electric current fed loop antennas 14 may be linearly arranged as shown in FIG. 18 or may be concentrically arranged. Further, in FIG. 18, the non-electric current fed loop antennas 14 are arranged in a planar direction, however, when the adjacent non-electric current fed loop antennas 14 are closely arranged, the non-electric current fed loop antennas 14 may be arranged in three-dimensional directions.

In such a structure, when the transmitting and receiving circuit (not shown in the drawing) of a reading and writing part 12 transmits a transmitting electric power and a transmitting signal of high frequency to a matching circuit 9 through a coaxial cable 11, the transmitting electric power and the transmitting signal of high frequency are supplied to an inner loop antenna 21a through a resonance circuit 8. That is, the electric current is fed to the inner loop antenna 21a, however, the electric current is not fed to an inner loop antenna 21.

In such a way, the inner loop antenna 21a can be electromagnetically coupled to the non-electric current fed loop antenna 14 by a mutual induction by making the outer loop antenna 21b function as a buffer. Accordingly, even if a plurality of non-electric current fed loop antennas 14 are increased, the variation of the resonance frequency of the inner loop antenna can be suppressed. As a result, while a communication range can be simply extended, a matching of impedance of the loop antenna unit 21 may not need to be adjusted. Therefore, even when the plurality of the non-electric current fed loop antennas 14 are increased, the matching of impedance of the loop antenna unit does not need to be adjusted, so that the communication range can be easily extended.

Further, since the electric current is not fed to the non-electric current fed loop antenna unit 14, the non-electric current fed loop antenna does not cause an excessively consumed electric power and gives no influence to other electronic devices, though an electric power can be saved.

Further, the loop antenna unit and the non-electric current fed loop antenna unit are laminated and a laminated structure is stored in a case, so that a thinned and miniaturized device can be realized and the device can be easily carried and installed. Further, durability or a weather resistance is improved, so that the device can be installed by simply placing it. Especially, when a communication range is desired to be changed, such a structure is particularly effective to increase the communication range to an optimum level.

Further, since the case in which the electric current fed loop antenna unit and the non-electric current fed loop antenna unit are stored is thin, the case can be easily disposed on the goods shelf or the like to communicate with the radio communication medium incorporated in the goods or the books and an external reading and writing part. Thus, for instance, the inventory management of physical distribution warehouses or shops, the goods management of the display shelves of supermarkets or stationers and the document management of government and public offices and ordinary offices can be carried out, and the present invention can be applied to various systems, applications and businesses.

The present invention is described in detail by referring to the specific embodiments. However, it is to be understood to a person with ordinary skill in the art that various changes or modifications may be made without departing the spirit and the scope of the present invention. For instance, the communication frequency is not particularly necessarily 13.56 MHz, and may be other frequency than 13.56 MHz located in an HF band(3-30 MHz).

This application is based on Japanese Patent Application (No. 2004-275318) filed on Sep. 22, 2004, Japanese Patent Application (No. 2004-287051) filed on Sep. 30, 2005 and Japanese Patent Application (No. 2005-139545) filed on May 12, 2005 and the contents thereof are incorporated herein as a reference.

INDUSTRIAL APPLICABILITY

The present invention concerns a radio communication medium processor for supplying electric power and transmit data to a radio communication medium such as a non-contact IC card or an IC tag accommodated in a goods shelf to obtain receive data from the radio communication medium by the variation of a load. More particularly, the present invention may be applied to uses in which the communication range needs to be enlarged such as management systems of medical supplies, dangerous materials and valuable materials or the like as well as an accommodating shelf or a display shelf in which the management of books and the management of goods can be automatically realized.

The invention claimed is:

1. A loop antenna unit having a plurality of loop antennas, said antenna unit comprising:
   a first loop antenna to which an electric current is fed;
   a second loop antenna, surrounding the first loop antenna, to which the electric current is not fed;
   a grounded metal member, the first loop antenna and the second loop antenna being connected to the metal member; and
   a single grounding cable for connecting the first loop antenna and the second loop antenna to the metal member.

2. A loop antenna unit according to claim 1, further comprising:
   a magnetic member disposed between the first loop antenna and the second loop antenna and the metal member.

3. A loop antenna unit according to claim 1, further comprising:
   a first circuit unit including a resonance circuit and a matching circuit connected to the first loop antenna and
   a second circuit unit including a resonance circuit, a matching circuit and a matched load connected to the second loop antenna.

4. A radio communication medium processor comprising:
   the loop antenna unit according to claim 1; and a reading and writing part connected to the first loop antenna of the loop antenna unit to carry out at least one of processes of reading and writing information stored in a radio communication medium through the first loop antenna, a signal current from the reading and writing part being fed only to the first loop antenna.

5. A radio communication medium processor according to claim 4, further comprising:

a third loop antenna to which an electric current is not fed, the third loop being arranged adjacently to the loop antenna unit.

6. A loop antenna unit comprising:

a loop antenna communicating with a radio communication medium and having a pair of opening end parts at both ends; and a metal member arranged closely to the loop antenna, wherein:

the metal member is electrically connected to one of the opening end parts of the loop antenna with a space about 1/200 to 1/4000 times as long as the wavelength of a communication frequency, and in the loop antenna unit, the loop antenna, a magnetic member, the metal member, a first isolating member disposed between the loop antenna and the magnetic member and a second isolating member disposed between the magnetic member and the metal member are laminated.

7. A loop antenna unit according to claim 6, wherein the loop antenna supplies an electric power and transmit data to the radio communication medium in accordance with an electromagnetic induction and obtains receive data from the radio communication medium in accordance with a load variation.

8. A loop antenna unit according to claim 6, wherein the area of the metal member is not smaller than about 1.1 times as large as the area of the opening part of the loop antenna.

9. A loop antenna unit according to claim 8, wherein the magnetic member has a flexibility.

10. A loop antenna unit according to claim 6, wherein:

the magnetic member is disposed between the loop antenna and the metal member, and the magnetic member has a flexibility.

11. A loop antenna unit according to claim 6, wherein one of the pair of the opening end parts is electrically connected to the metal member, an unbalanced type resonance circuit and a ground terminal of a matching circuit, and the other of the pair of the opening end parts is connected to the unbalanced type resonance circuit and a signal terminal of the matching circuit.

12. A loop antenna unit according to claim 6, wherein one of the pair of the opening end parts is connected to a ground terminal of a reading and writing part for reading, writing or reading and writing data of the radio communication medium, and the other of the pair of the opening end parts is connected to a signal terminal of the reading and writing part.

13. A loop antenna unit according to claim 6, wherein the loop antenna is formed with a pattern conductor provided on an electronic board and the electronic board is laminated as the loop antenna.

14. A loop antenna unit according to claim 13, wherein a resonance circuit and a matching circuit are formed on the electronic board.

15. A loop antenna unit according to claim 6, wherein the loop antenna unit is stored in an accommodating case.

16. A loop antenna unit according to claim 6, wherein the loop antenna unit is accommodated in a housing.

17. A loop antenna unit according to claim 6, wherein a plurality of the loop antenna units are arranged linearly, in radial directions or on arrays substantially on the same planes.

18. A loop antenna unit according to claim 17, wherein the plurality of the loop antenna units include electric current fed loop antenna units to which a signal current is fed and non-electric current fed loop antenna units to which the signal current is not fed.

19. A radio communication medium processor comprising:

a plurality of loop antenna units according to claim 6 and a reading and writing part for reading, writing or reading and writing data on a radio communication medium, wherein the plurality of the loop antenna units include electric current fed loop antenna units to which a signal current is fed and non-electric current fed loop antenna units to which the signal current is not fed.

20. A radio communication medium processor according to claim 19, wherein the reading and writing part is connected only to the electric current fed loop antenna units among the plurality of loop antenna units.

* * * * *